(12) United States Patent
Zhao et al.

(10) Patent No.: US 7,957,977 B2
(45) Date of Patent: Jun. 7, 2011

(54) MEDIA PROGRAM IDENTIFICATION METHOD AND APPARATUS BASED ON AUDIO WATERMARKING

(75) Inventors: Junhui Zhao, Beijing (CN); Yucheng Wei, Beijing (CN); Min-Yu Hsueh, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 985 days.

(21) Appl. No.: 11/782,950

(22) Filed: Jul. 25, 2007

(65) Prior Publication Data
US 2008/0027734 A1 Jan. 31, 2008

(30) Foreign Application Priority Data
Jul. 26, 2006 (CN) .......................... 2006 1 0099527

(51) Int. Cl.
*H04B 1/66* (2006.01)
*H04K 1/00* (2006.01)
*H04L 9/00* (2006.01)

(52) U.S. Cl. ........ 704/500; 375/140; 375/269; 380/252; 380/268; 713/176

(58) Field of Classification Search .................. 704/220, 704/500, 502; 726/26; 380/252, 268; 713/176; 375/140, 269
See application file for complete search history.

(56) References Cited

U.S. PATENT DOCUMENTS

| | | |
|---|---|---|
| 5,581,800 A | 12/1996 | Fardeau et al. |
| 5,848,155 A | 12/1998 | Cox |
| 5,893,061 A | 4/1999 | Bender et al. |
| 6,097,761 A * | 8/2000 | Buhring et al. ............... 375/257 |
| 6,674,861 B1 * | 1/2004 | Xu et al. ....................... 380/252 |
| 6,792,542 B1 | 9/2004 | Lee et al. |
| 7,010,052 B2 * | 3/2006 | Dill et al. ...................... 375/265 |
| 7,421,304 B2 * | 9/2008 | Sato .............................. 700/94 |

(Continued)

FOREIGN PATENT DOCUMENTS
JP 2000-236432 A 8/2000

(Continued)

OTHER PUBLICATIONS

H. O. Oh, et al, "New Echo Embedding Technique for Robust and Imperceptible Audio Watermarking", Proc. IEEE Int. Conf. Acoustics Speech, and Signal Processing, vol. 3, 2001, pp. 1341-1344.

(Continued)

*Primary Examiner* — Martin Lerner
(74) *Attorney, Agent, or Firm* — Sughrue Mion, PLLC

(57) ABSTRACT

The invention provides a method for obtaining related information about a media program containing an audio signal, comprising: embedding an audio watermark containing identification information of the media program into the audio signal; transmitting the media program; recording a portion of the audio signal; extracting the audio watermark from the recorded portion to obtain the identification information and providing the identification information to a server; and providing the user with the related information according to the identification information from the server, wherein the embedding comprises: performing pre-processing on the identification information to obtain pre-processed identification information; determining an echo delay array; modulating amplitudes of the plurality of pairs of antipodal echoes with the pre-processed identification information; repeating the amplitude-modulated plurality of pairs of antipodal echoes; and embedding the repeated and amplitude-modulated plurality of pairs of antipodal echoes into the audio signal along the echo delay array.

22 Claims, 10 Drawing Sheets

U.S. PATENT DOCUMENTS

| | | | |
|---|---|---|---|
| 2002/0078359 A1* | 6/2002 | Seok et al. | 713/176 |
| 2003/0172277 A1 | 9/2003 | Suzuki et al. | |
| 2006/0174348 A1* | 8/2006 | Rhoads et al. | 726/26 |
| 2008/0240513 A1* | 10/2008 | Xie et al. | 382/113 |
| 2010/0090899 A1* | 4/2010 | Zhao et al. | 342/387 |

FOREIGN PATENT DOCUMENTS

| | | |
|---|---|---|
| JP | 2002-505758 A | 2/2002 |
| JP | 2002-314980 A | 10/2002 |
| JP | 2003-263183 A | 9/2003 |
| JP | 2005-266013 A | 9/2005 |
| JP | 2006-086901 A | 3/2006 |
| WO | 2006/049205 A1 | 5/2006 |

OTHER PUBLICATIONS

Tiesheng Fan et al. "Echoing Method for Audio Digital Watermark Based on Spreading Factor", Computer Application, vol. 26, Jun. 2006.

Japanese Office Action, dated Sep. 6, 2010, issued in Application No. 2007-189849.

* cited by examiner

MEDIA PROGRAM IDENTIFICATION METHOD AND APPARATUS BASED ON AUDIO WATERMARKING

FIELD OF THE INVENTION

The invention relates to multimedia signal processing, and more particularly, to a method and an apparatus for identifying media programs based on audio watermarking.

BACKGROUND

Currently, various media programs are broadcasted over television and radio network. The term "media program" as used herein may refer to a television (TV) program, radio program, etc. containing an audio signal. Examples of media program include product advertisement, weather forecast and news reporting. Such programs typically contain some broadcast segments. For example, the product advertisement program includes various product advertisements, wherein one broadcast segment corresponds to a piece of advertisement. Typically, these broadcast segments are very fleeting (about 30-60 second/clip) and supply only concise introductions. In many occasions, the viewers are not satisfied with the short information offered by the broadcasted program and hope to obtain more related information.

For example, an audience suddenly hears a piece of news that catches his attention and wishes to acquire the detailed information about it when he is watching "News Reporting" program on TV. However, the television program he is watching presents only a brief summary about the news. At this time, the audience could call the television station to query about this news, or spend time searching the background information at Internet, but both are too cumbersome.

Considering the ever-increasing popularity of mobile devices, it will be convenient if the audience could push a few buttons on his mobile device towards TV and receive the detailed information about the news on his phone or via his default email address a few seconds later. The term "mobile device" as used herein covers various portable terminals equipped with audio recording means (such as microphone), such as cellular phones and Personal Digital Assistants (PDA), etc.

A key aspect of the above scenario is identification of a media program containing an audio signal. There are a number of methods for identifying a media program containing an audio signal in the prior art. One possible approach to the identification of broadcast segments containing audio signal involves audio fingerprinting, in which each segment should be analyzed before broadcast to form its "fingerprint". In recognition phase, the decoder attempts to analyze the characteristics of a segment being broadcast and match it to one of the fingerprints, i.e., recognize its pattern. This approach uses relatively complicated technology and is cumbersome to implement because it needs to update the patterns for recognizing new broadcast segment. In particular, the approach cannot be applied in live broadcast case due to the unavailability of corresponding patterns.

Another identification approach involves audio watermarking. Technically speaking, digital audio watermarking is a technique of hiding secret signals into host signals in an imperceptive way. The secret signals cannot be removed through standard processing, transmission, and/or recording of the host data, and can be extracted by appropriately designed watermark detectors. In the prior art, there are some related inventions discussing media program identification thru audio watermarking. For example, in U.S. Pat. No. 5,848,155 to Cox entitled "Spread Spectrum Watermark for Embedded Signaling", a watermark is embedded into audio/image/video/multimedia data by using spread spectrum technology. U.S. Pat. No. 6,792,542 B1 to Lee et al. entitled "Digital System for Embedding a Pseudo-randomly Modulated Auxiliary Data Sequence in Digital Samples" discloses a scheme of embedding auxiliary digital information by employing a pseudo-random sequence to modulate the Least Perceptually Significant Bits (LPSBs) of successive multi-bit samples of the host signal. U.S. Pat. No. 5,893,067 to Bender et al. entitled "Method and Apparatus for Echo Data Hiding in Audio Signals" embeds one or more echoes into the host audio signal. U.S. Pat. No. 5,581,800 to Fardeau et al. entitled "Method And Apparatus for Automatically Identifying a Program Including a Sound Signal" discloses a method for encoding message in the sound signal by altering the energy of some frequency components in a characteristic manner that is predetermined and repeated. Besides, U.S. Patent Application Publication No. US 2003/0172277 A1 to Yoiti Suzuki et al. entitled "Digital Watermark System" discloses a digital watermark embedding method of inserting the generated echo signal in the original audio signal by spreading the echo signal on the time axis.

Spread Spectrum from Cox's patent modulates the hiding data into a set of pseudo random sequences that are embedded in host audio signal. This method has the advantages of easy implementation, good security, robustness to various attacks, etc. But there is a fatal drawback for the Spread Spectrum method that encumbers its practical application, i.e., it is vulnerable to the desynchronization attack in watermark detection. Echo Hiding from Bender's scheme embeds hiding data into host signal by introducing an echo in time domain. It is widely adopted since it has many remarkable features, such as high immunity of synchronization attack, self-sufficient blind detection, and little noticeable noise. However, Echo Hiding also has serious disadvantages of low capacity and lenient decoding process.

Albeit by combining Spread Spectrum and Least Perceptually Significant Bit techniques for improving the imperceptibility of the watermarked signal, Lee's scheme is unsatisfactory because it is vulnerable to the environmental noise. In particular, it employs a check code to meet the requirement of self-synchronization, i.e., the decoder is synchronized when the received watermarks plus check code match up the computed check code. This process needs to search exhaustingly the synchronization sample by sample. Fardeau's scheme requires a specialized pager-like equipment to detect the embedded identification message. Additionally, note that the frequency components selected for encoding the sound signal are chosen to lie in the range near 100 Hz so that it may suffer from the low pass filtering attack that is a common preprocess operation for various audio compression algorithms. Yoiti's method combines Echo Hiding and Spread Spectrum for improving the capacity and security compared with the conventional techniques. However, considering the downsample attack existing in media interaction scenarios, the length of the allowed embedding echo array is limited so that it can not provide the desired PN sequence long enough to guarantee the good statistical property. On the other hand, this method is vulnerable to the echo jitter attack.

Therefore, the prior art fails to provide an effective method and apparatus for identifying a media program based on audio watermarking so as to obtain the related information about the media program.

In view of watermarking technology, there are some typical attacks to audio watermarking system in the scenario of media and mobile device interaction. These attacks include randomly cropping, AD/DA conversion, resampling, audio compression, environment noise, reverberation, etc. For watermaking systems under the background of the present invention, randomly cropping, AD/DA conversion and resampling are most serious attacks. It is due to the following reasons:

1) Audiences can record randomly the watermarked audio clip with the length of only several seconds that is a small portion of host signal;

2) The capture of encoded audio is handled by recording at mobile device side in an analog manner while the watermark embedding is performed in a digital manner; and 3) The watermark embedding must work on 44.1K sample rate to ensure the quality of host signal, while the mobile device allows recording at lower (such as 8K) sample rate only.

Accordingly, there exists a need for a method and an apparatus for identifying a media program based on audio watermarking so as to obtain related information about the media program, which enables convenient acquirement of related information about the media program, has no effect on the quality of the media program, and is able to resist various environment attacks.

SUMMARY OF THE INVENTION

An object of the invention is to provide a method and an apparatus for identifying a media program based on audio watermarking so as to obtain related information about the media program, which enables convenient acquirement of related information about the media program, has no effect on the quality of the media program, and is able to resist various environment attacks.

According to one aspect of the invention, there is provided a method for obtaining related information about a media program containing an audio signal, comprising: an embedding step of embedding an audio watermark containing identification information of the media program into the audio signal of the media program; a transmitting step of transmitting the media program; a recording step of recording by a user a portion of the audio signal of the media program embedded with the audio watermark; an extracting step of extracting the audio watermark from the recorded portion of the audio signal to obtain the identification information and providing the identification information to a server storing the related information; and a related information providing step of providing the user with the related information about the media program according to the identification information from the server, wherein the embedding step comprises: identification information pre-processing step of performing a pre-processing on the identification information of the media program to obtain pre-processed identification information of the media program; echo delay array determining step of determining an echo delay array used in embedding a plurality of pairs of antipodal echoes into the audio signal; amplitude modulating step of modulating amplitudes of the plurality of pairs of antipodal echoes with the pre-processed identification information; echo repeating step of repeating the amplitude-modulated plurality of pairs of antipodal echoes; and echo embedding step of embedding the repeated and amplitude-modulated plurality of pairs of antipodal echoes into the audio signal along the echo delay array.

According to another aspect of the invention, there is provided a system for obtaining related information about a media program containing an audio signal, comprising: embedding means for embedding an audio watermark containing identification information of the media program into the audio signal of the media program; transmitting means for transmitting the media program; recording means for recording a portion of the audio signal of the media program embedded with the audio watermark; extracting means for extracting the audio watermark from the recorded portion of the audio signal to obtain the identification information and providing the identification information to a server storing the related information; and related information providing means located on the server for providing the related information about the media program according to the identification information, wherein the embedding means comprises: identification information pre-processing means for performing a pre-processing on the identification information of the media program to obtain pre-processed identification information of the media program; echo delay array determining means for determining an echo delay array used in embedding a plurality of pairs of antipodal echoes into the audio signal; amplitude modulating means for modulating amplitudes of the plurality of pairs of antipodal echoes with the pre-processed identification information; echo repeating means for repeating the amplitude-modulated plurality of pairs of antipodal echoes; and echo embedding means for embedding the repeated and amplitude-modulated plurality of pairs of antipodal echoes into the audio signal along the echo delay array.

According to another aspect of the invention, there is provided an apparatus for embedding an audio watermark into an audio signal, comprising: identification information pre-processing means for performing a pre-processing on identification information related to the audio signal to obtain pre-processed identification information; echo delay array determining means for determining an echo delay array used in embedding a plurality of pairs of antipodal echoes into the audio signal; amplitude modulating means for modulating amplitudes of the plurality of pairs of antipodal echoes with the pre-processed identification information; echo repeating means for repeating the amplitude-modulated plurality of pairs of antipodal echoes; and echo embedding means for embedding the repeated and amplitude-modulated plurality of pairs of antipodal echoes into the audio signal along the echo delay array.

According to another aspect of the invention, there is provided a method for embedding an audio watermark into an audio signal, comprising: identification information pre-processing step of performing a pre-processing on identification information related to the audio signal to obtain pre-processed identification information; echo delay array determining step of determining an echo delay array used in embedding a plurality of pairs of antipodal echoes into the audio signal; amplitude modulating step of modulating amplitudes of the plurality of pairs of antipodal echoes with the pre-processed identification information; echo repeating step of repeating the amplitude-modulated plurality of pairs of antipodal echoes; and echo embedding step of embedding the repeated and amplitude-modulated plurality of pairs of antipodal echoes into the audio signal along the echo delay array.

According to another aspect of the invention, there is provided an apparatus for extracting an audio watermark from an audio signal, wherein the audio watermark is embedded in the audio signal by amplitude-modulating echoes embedded in the audio signal by using pre-processed identification information related to the audio signal, the apparatus comprising: cepstrum analyzing means for performing a cepstrum analysis on the audio signal to obtain the pre-processed identification information; and identification information recovering means for recovering the identification information by performing an inverse-processing of the pre-processing on the pre-processed identification information.

According to another aspect of the invention, there is provided a method for extracting an audio watermark from an audio signal, wherein the audio watermark is embedded in the audio signal by amplitude-modulating echoes embedded in the audio signal by using pre-processed identification information related to the audio signal, the method comprising: cepstrum analyzing step of performing a cepstrum analysis on the audio signal to obtain the pre-processed identification information; and identification information recovering step of recovering the identification information by performing an inverse-processing of the pre-processing on the pre-processed identification information.

Therefore, compared with the prior art, the present invention presents, among others, the following advantages:

1) The media program identification technology based on audio watermarking of the invention enables the audience to conveniently obtain related information of interest from the media program;

2) The media program identification technology based on audio watermarking of the invention is especially suitable for live broadcast programs, such as news reporting;

3) The media program identification technology based on audio watermarking of the invention is secure, i.e. the watermark is undetectable without any prior knowledge of the embedded watermarking sequence, which benefits from the introduction of pseudo random sequence and permutation.

4) The media program identification technology based on audio watermarking of the invention can provide high data capacity for identifying a large amount of the broadcast programs, which benefits from the antipodal echo process to broaden the echo embedding region;

5) The media program identification technology based on audio watermarking of the invention can provide better robustness against various distortions, which benefits from ECC and redundancy processing.

6) The invention contributes an Analysis-by-Synthesis method to find a map relationship of echo offsets between different sample rates in order to resist the resampling attack.

7) The media program identification technology based on audio watermarking of the invention can prevent the jitter of the echo offset position at the decoder side, which benefits from echo repetition process.

These and other advantages and features of the invention will be apparent from the detail description taken in conjunction with the figures.

DETAILED DESCRIPTION OF THE PREFERRED EMBODIMENTS

Embodiments of the inventions will be described with reference to the figures hereinafter.

Figure 1:
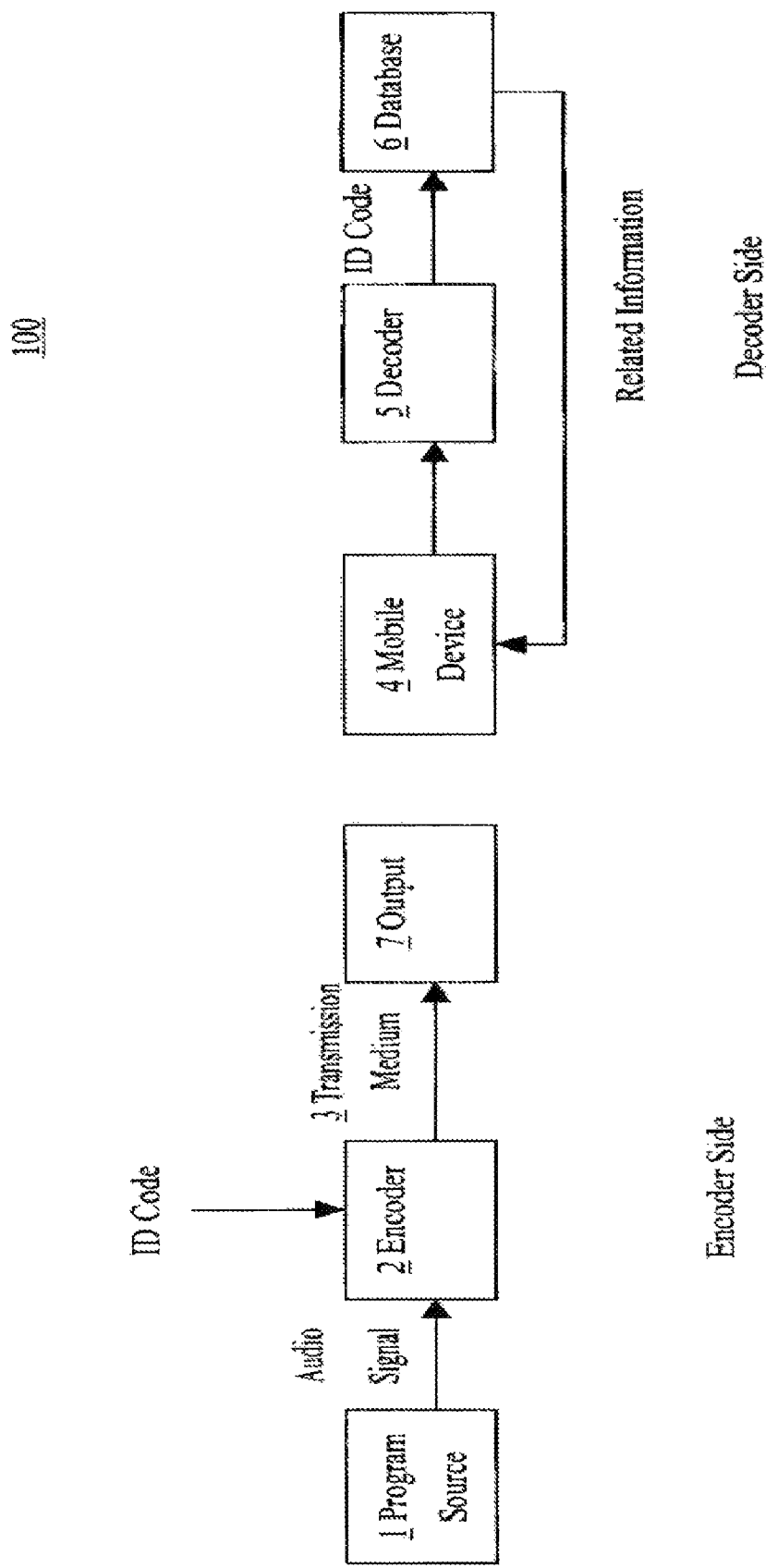
FIG. 1 depicts the schematic block diagram of a system 100 according to an embodiment of the invention.

FIG. 1 depicts the schematic block diagram of a system 100 according to the invention. As shown in the figure, the system 100 according to the invention comprises a program source 1, an encoder 2, a transmission medium 3, a mobile device 4, a decoder 5, a database 6, and an output device 7. The program source 1 provides a media program containing an audio signal. The media program containing the audio signal provided by the program source 1 is input to encoder 2, where an identification code (ID code) is embedded into the audio signal part. The identification code herein is an example form of identification information. This encoding process can be done at the audio level and leave the other parts of the media program unchanged. The encoded signal may be transmitted over the transmission medium 3, and then applied to the output device 7. The transmission medium 3 may be any wired or wireless transmission medium capable of transmitting media programs, and the output device 7 is, for example, a loudspeaker. On the receive side of the system, the audio recording means (not shown) of the mobile device 4 picks up the audio signal played from the loudspeaker, wherein the audio recording means may be a microphone. Then, the encoded audio signal is decoded in the decoder 5 to extract the hidden ID code. Note that the decoder 5 shown in FIG. 3 resides with a server (not shown), wherein the audio signal recorded by the mobile device 4 is transmitted to the server via a second transmission medium (not shown). However, this is an exemplary implementation. Actually, the decoder 5 can locate within the mobile device 4, in which case there is no need for the second transmission medium to transmit the audio signal and the decoding process can be performed within the mobile device 4. The ID code extracted in the decoding process is used as a link to the database 6, which contains related information about the media program itself. Consequently, the related information can be sent back to the mobile device 4 so as to provide the user with the related information about the media program. The ways of providing the related information may include, but are not limited to, text, picture, audio, video or multimedia, which are all considered to be within the scope of the invention. The present invention can be implemented in a number of different ways, for example, by mixed-signal integrated circuits, as a discrete component electronic device, or software programming of a digital processor, or a combination of such implementations.

Figure 2:
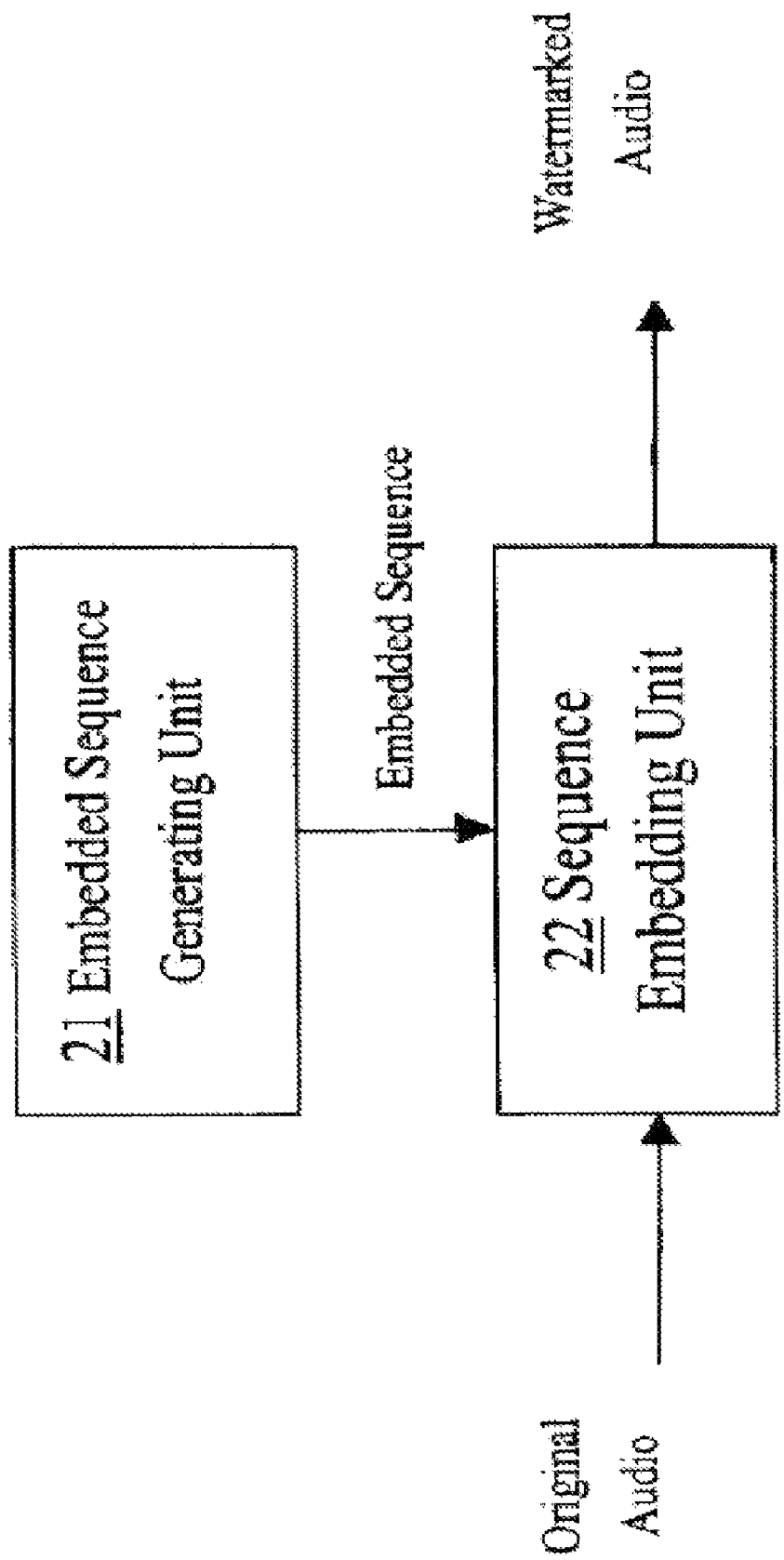
FIG. 2 depicts the schematic block diagram of an encoder 2 according to the embodiment of the invention.

FIG. 2 depicts the schematic block diagram of the encoder 2 according to the invention. As shown in FIG. 2, the encoder 2 comprises an embedded sequence generating unit 21 and a sequence embedding unit 22. The embedded sequence generating unit 21 is employed to encode k-bit ID code so that an embedded sequence with length of N is output. The k-bit ID is associated with a media program. The embedded sequence is then embedded into the original audio signal in the sequence embedding unit 22. Specifically, in the sequence embedding unit 22, a set of antipodal echoes that are time-spread along a predefined echo delay array is amplitude modulated according to the generated embedded sequence.

Figure 3:
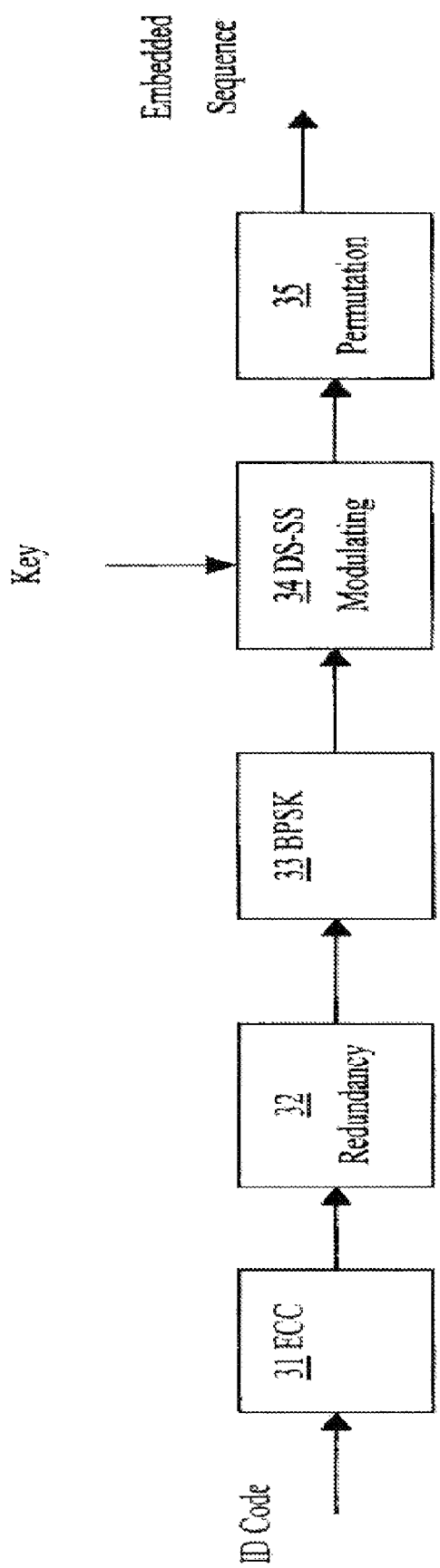
FIG. 3 depicts the schematic block diagram of an embedded sequence generating unit 21.

FIG. 3 depicts the schematic block diagram of the embedded sequence generating unit 21.

The embedded sequence generating unit 21 comprises an Error Correction Coding (ECC) module 31, a redundancy module 32, a Binary Phase Shift Keying (BPSK) module 33, a Direct Sequence Spread Spectrum (DS-SS) modulating module 34, and a permutation module 35.

The ECC module 31 performs an Error Correction Coding (ECC) on the k-bit ID code to generate an n-bit codeword $\{c_1, c_2, c_3, \ldots c_n\}$ and provides it to the redundancy module 32. In this embodiment, the ECC module 31 can employ many existing Error Correction Coding methods, such as CRC and Hamming method. A typical example is BCH codec constructing with the parameters (n, k, p), where n is the length of the codeword, k is the length of ID code and p is the number of bit errors that can be corrected.

In the redundancy module 32, with a predetermined integer value N, each bit of the codeword, $c_j$, is repeated $l=N/n$ times to produce a redundant sequence with length N as expressed by the following equation and provided to the BPSK module 33:

$$\{b_i\} = \underbrace{\overbrace{c_1 \ldots c_1}^{l\ times} c_2 \ldots c_2 \ldots c_n \ldots c_n}_{N} \quad (1)$$

The BPSK module 33 maps each bit of the above data into a bit stream as (1->+1; 0->-1) by using BPSK modulation. The output of the BPSK module 33 is provided to the DS-SS modulating module 34.

The DS-SS modulating module 34 prepares a pseudo random sequence with length $$l, \{r_i^{(j)}\} \left( r_i^{(j)} = \pm 1, \sum_{i=1}^{l} r_i^{(j)} = 0 \right)$$

for each $j=1 \ldots n$ and sequence with length N, wherein the $\{r_i\}$ is obtained by $$\{r_i\} = \underbrace{\overbrace{r_1^{(1)} \ldots r_l^{(1)}}^{l} \ldots r_1^{(2)} \ldots r_l^{(2)} \ldots r_1^{(n)} \ldots r_l^{(n)}}_{N} \quad (2)$$

Then, the repeated message $\{b_i\}$ is modulated by a carrier signal $\{r_i\}$. This modulation is known as Direct Sequence Spread Spectrum (DS-SS) modulation, and is performed as $$s_i = b_i r_i (i=1, \ldots N) \quad (3)$$

The permutation module 35 receives the output of the DS-SS modulating module 34 and performs a pseudo randomly determined permutation on it as:

$$\begin{pmatrix} 1 & 2 & 3 & \ldots & N \\ o_1 & o_2 & o_3 & \ldots & o_N \end{pmatrix} \quad (4)$$

With this permutation, the order of $\{s_i\}$ element is scrambled and the embedded sequence $\{a_i\}$ is obtained as below.

$$a_i = s_{o_i} (i=1, \ldots, N) \quad (5)$$

Through the above process of the embedded sequence generating unit 21, robustness based on DS-SS modulation is obtained because the same pseudo random sequence used at the encoder is also needed at the decoder to recover the identification information which adds a measure of security to identification information. Furthermore, scramble by permutation is brought into effect as interleave coding, i.e. reducing the imbalance of robustness among bits.

Figure 4:
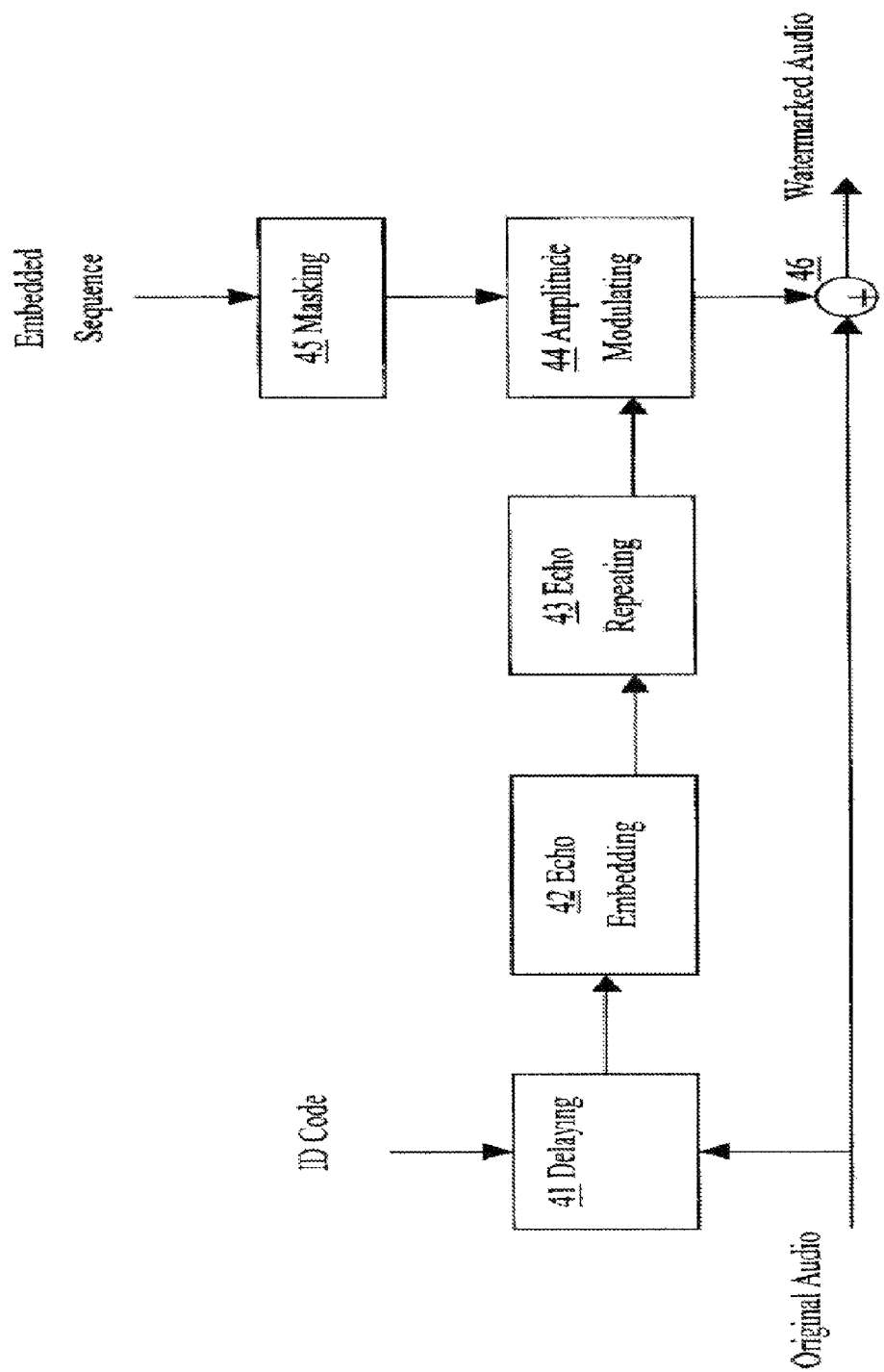
FIG. 4 depicts the schematic block diagram of a sequence embedding unit 22.

FIG. 4 depicts the schematic block diagram of the sequence embedding unit 22. The sequence embedding unit 22 comprises a delaying module 41, an echo embedding module 42, an echo repeating module 43, an amplitude modulating module 44, a masking module 45 and an adder module 46. In the delaying module 41, the original audio signal is delayed by various time offsets that are determined by searching beforehand the echo array through an Analysis-by-Synthesis (ABS) approach in order that the watermarks can be detected accurately after resampling. The delayed signal is input to the echo embedding module 42. In the echo embedding module 42, an echo embedding process is performed, wherein for each pre-determined delay offset, a positive gain parameter is multiplied to the delayed host signal for obtaining a positive attenuation version of the host signals. Accordingly, a negative version is created at the very near pre-determined delay offset for causing minimal disturbance to the quality of the host signal. The output of the echo embedding module 42 is provided to the echo repeating module 43, where the antipodal echo process is repeated several times for the purpose of preventing echo jitter problem. Thus, the output of the echo repeating module 43 is a set of antipodal attenuated host signals, which is provided to the amplitude modulating module 44. In the amplitude modulating module 44, the amplitudes of these delayed signals are modulated with embedded sequence generated from the embedded sequence generating unit 21. Before the modulation, in the masking module 45, a suppression processing is performed on the embedded sequence to prevent causing the audible perception degradation of the quality of the audio signal. Finally, in the adder module 46, the modulated signals are added to the original audio signal to provide the watermarked audio signal.

Figure 5:
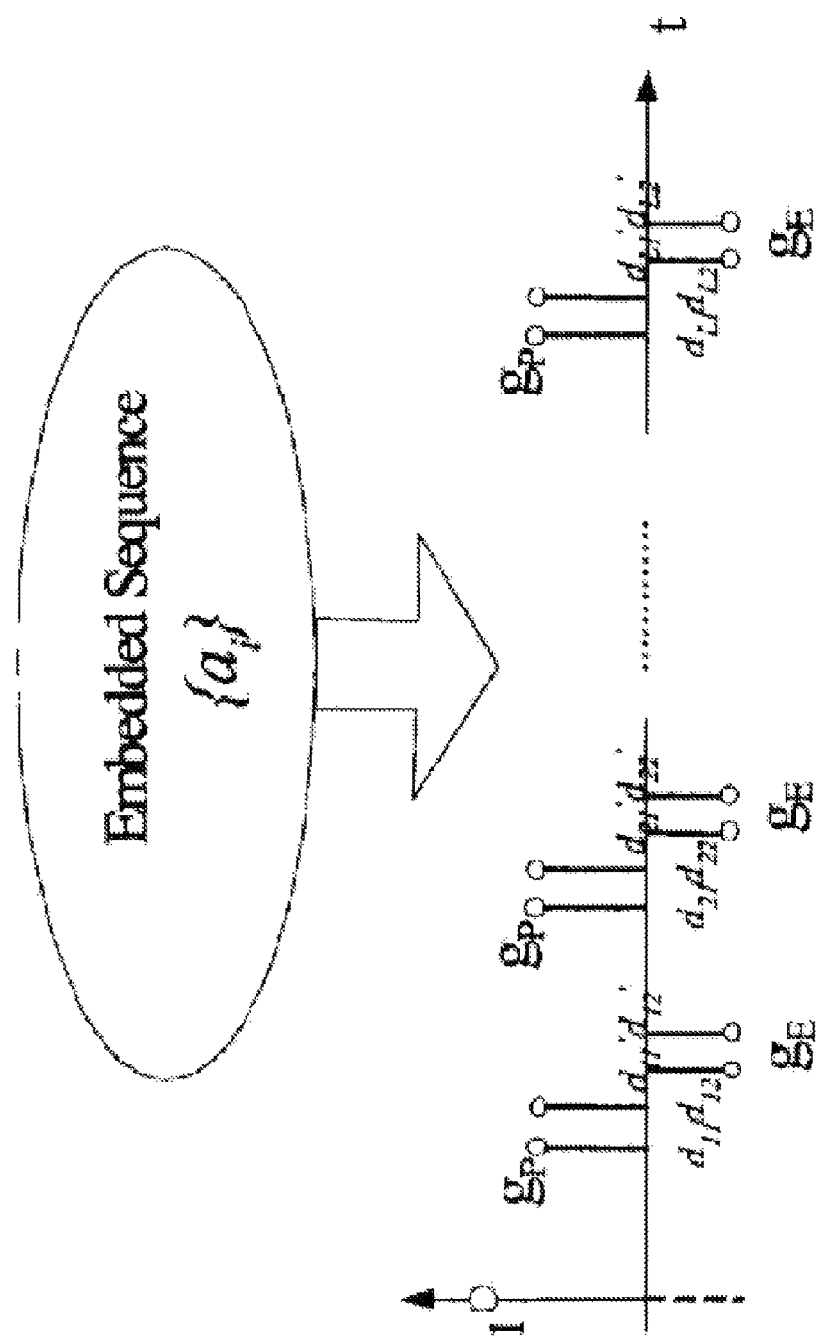
FIG. 5 depicts a filter representation of the antipodal echo array modulation process.

From the viewpoint of filtering operation, the above antipodal echo array modulation process can be illustrated as FIG. 5. Mathematically, the impulse response of the filter shown in FIG. 5 can be expressed as Equation (6):

$$h(\tau) = \delta(\tau) + \sum_{i=1}^{N} \sum_{m=1}^{M} \alpha_i [g_P \delta(\tau - d_{im}) - g_E \delta(\tau - d'_{im})] \quad (6)$$

where $g_P \delta(\tau - d_{im}) - g_E \delta(\tau - d_{im}')$ represents the antipodal echo. $g_P$ and $g_E$ are the gain parameters of the positive echo and negative echo in antipodal echo, respectively. Generally, $g_P$ is always greater than $g_E$ so that the first echo is dominant and the second one is subsidiary. $d_{im}$ is the delay offset of the m-th repetition of the i-th positive echo and accordingly $d_{im}'$ is the one of negative echo. M is the repetition times. In this embodiment, M=2 is used. However, this is only an example and M can take any other values greater than 2. On the other hand, in this embodiment, the distance of d and d' is less than 3, such as $|d'-d|<=3$. $\{a_i, i=1, \ldots, N\}$ is the embedded sequence with the length of N. The way of mapping the embedded sequence onto the filter function is to modulate the amplitudes of the antipodal echo signals with the elements of the embedded sequence. It is typically desired to have a small gain value for the amplitude of these echoes so as to keep the modulated signals transparent to the perceiver of the host signal. For this reason, the |a*g| should be below 0.2.

The antipodal echo technique early discussed in H. O. Oh, et al., "New Echo Embedding Technique for Robust and Imperceptible Audio Watermarking," Proc. IEEE Int. Conf. Acoustics, Speech, and Signal Processing, vol. 3, 2001, pp. 1341-1344 may cause minimal distortion to the lower bands of the audio signal compared with the conventional signal echo. It should be noted that the lower bands response plays a key role to determine the sound quality and especially, the shapes at a few lowest bands determine the timbre of echoed audio signal. The advantage of antipodal echo technique is that the broadening of the region of echo embedding for providing a high capacity is possible without deteriorating the quality of the host signal. In practice, in order to ensure that the antipodal echo can hardly cause the noticeable audio artifacts, the second delay is typically less than 3 samples away from the first offset such that |d'−d|<=3. On the other hand, $g_P$ is always bigger than $g_N$ so that the first echo is dominant and the second one is subsidiary.

The antipodal echo process is done repeatedly in the echo repeating module 43. This process is motivated by the fact that resampling operation always leads to the jitter of the echo offset position at the decoder 5, that is, the echo position changes one sample or so before and after resampling operation. It is also regarded as a "desynchronization" problem. Especially in the scenario of media interaction, the mobile device 4 allows recording only in 8K sample rate while the watermark must be embedded at 44.1K to guarantee the quality of the host audio signal. Thus, a downsampling operation should appear at mobile device side 4 when the watermarked audio signal is recorded. At the decoder 5, the detection is based on a rule that the decoder 5 knows the exact echo offset positions at 8K sample rate. However, the echo position may happen to jitter when various microphones are applied. Thus, a repetition process is employed in the present invention in order to prevent the problem, where two antipodal echo signals are inserted into the host signal and they have only one sample distance.

Figure 6:
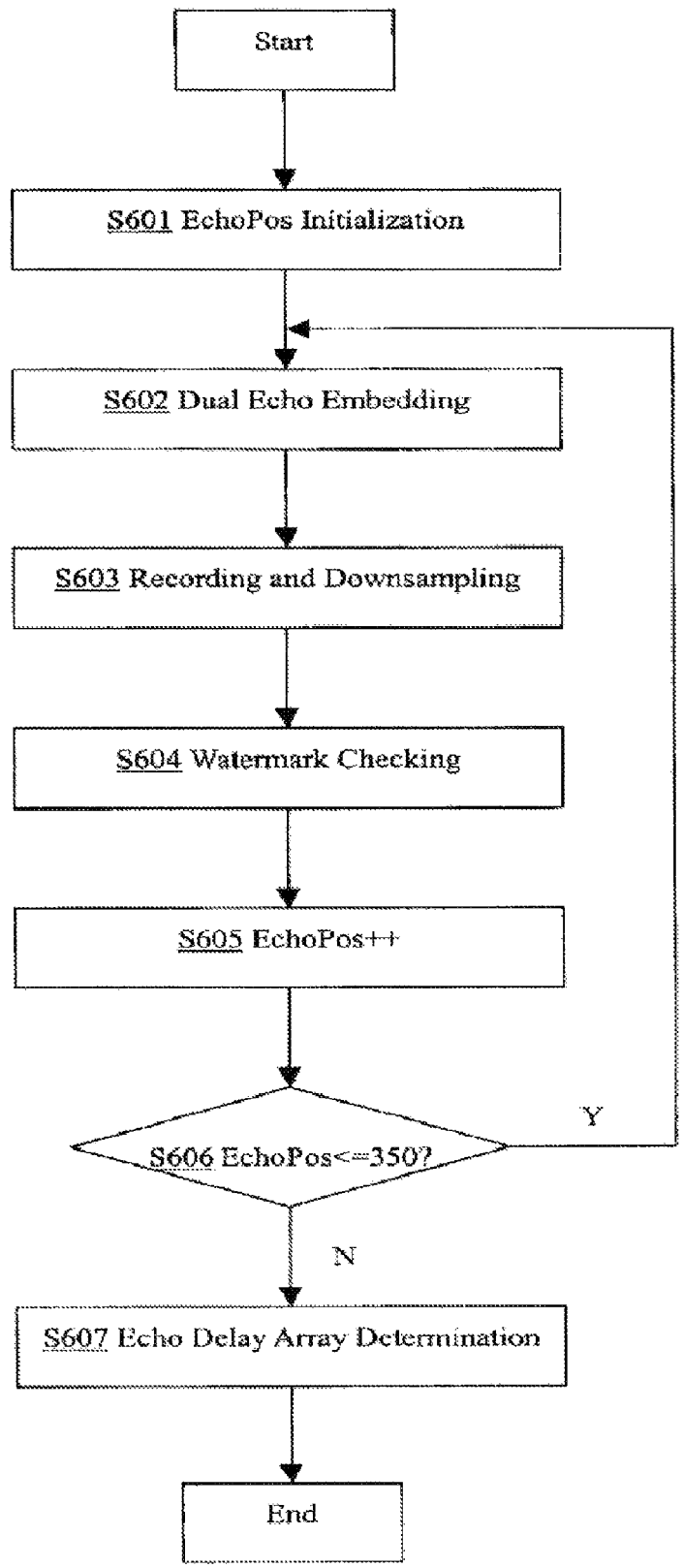
FIG. 6 depicts the flowchart of the Analysis-by-Synthesis approach of the invention.

FIG. 6 depicts the flow chart of the Analysis-by-Synthesis approach of the invention. The object of the Analysis-by-Synthesis approach is to find a map relationship of echo offsets between 44.1k and 8K sample rate in order to ensure that the decoder 5 would accurately position the echo delay offset at the different sample rates and then recover the hidden identification information according to the corresponding decoding method. It is to be noted that the sample rates of 44.1K and 8K are only exemplary, and the Analysis-by-Synthesis approach of the invention applies to other sample rates as well.

In the present invention the echo delay ranging from 90 to 350 samples at the sample rate of 44.1K are evaluated because the range is always taken as the sound transparency region into which the antipodal echo can be embedded without deteriorating the quality of original audio signal.

In step S601, EchoPos is initialized and set to 90. In step S602, a dual echo embedding is performed, that is, antipodal echo with the delay interval of 2 samples is embedded. In step S6039 the watermarked audio signal is recorded and downsampled at 8K sample rate.

In step S604, the watermarked signal is decoded. The decoding is based on cepstrum computation shown as $$q(w) = \text{real}[\text{IDFT}[\log(\text{DFT}(x(t)))]] \quad (7)$$

where x(t) is the received signal, DFT( ) is the Discrete Fourier Transform and IDFT( ) is the Inverse DFT, real( ) returns the real part of complex number. It should be pointed out that the downsampling operation will cause the antipodal echo at 44.1K to merge into one and the echo delay position to shift. The echo delay at 8K can be determined by searching the autocorrelation peak of cepstrum values, which is expressed as $$\text{EchoPos\_8k} = \underset{w}{\arg\max}[\text{autocorr}(q(w))] \quad (8)$$

In step S605, shift one sample, i.e., set EchoPos=EchoPos+1. In step S606, it is determined whether EchoPos is greater than 350. If true, the process returns to step S602 and repeats step S602 through S605 until all the echo offsets have been processed. Otherwise, the process proceeds to step S607.

In step S607, the exact embedding position at 44.1k that corresponds to the maximum peak at 8K case is located. For example, in Table 1 below, the left column lists the echo offsets at 44.1 k while having the same echo offset 18 at 8k after downsampling process and the right column shows the corresponding cepstral autocorrelation coefficient at delay offset 18 at 8K sample rate. Here, the delay 100 can be chosen as the echo embedding position because it has max value of cepstral autocorrelation at the delay 18 at the 8K case. Such a process is carried out for each delay at 8K and then N points are selected from the echo delay candidates, thus yielding an N-dimensional echo delay array for embedding and detecting watermarks.

TABLE 1

| Echo delay list at 44.1K corresponding to position 18 at 8K | | |
|---|---|---|
| EchoPos (44.1K) | EchoPos (8K) | Cepstral Autocorrelation |
| 98 | 18 | 2.68 |
| 99 | 18 | 3.67 |
| 100 | 18 | 4.18 |
| 101 | 18 | 4.06 |
| 102 | 18 | 3.39 |
| 103 | 18 | 2.33 |

Figure 7:
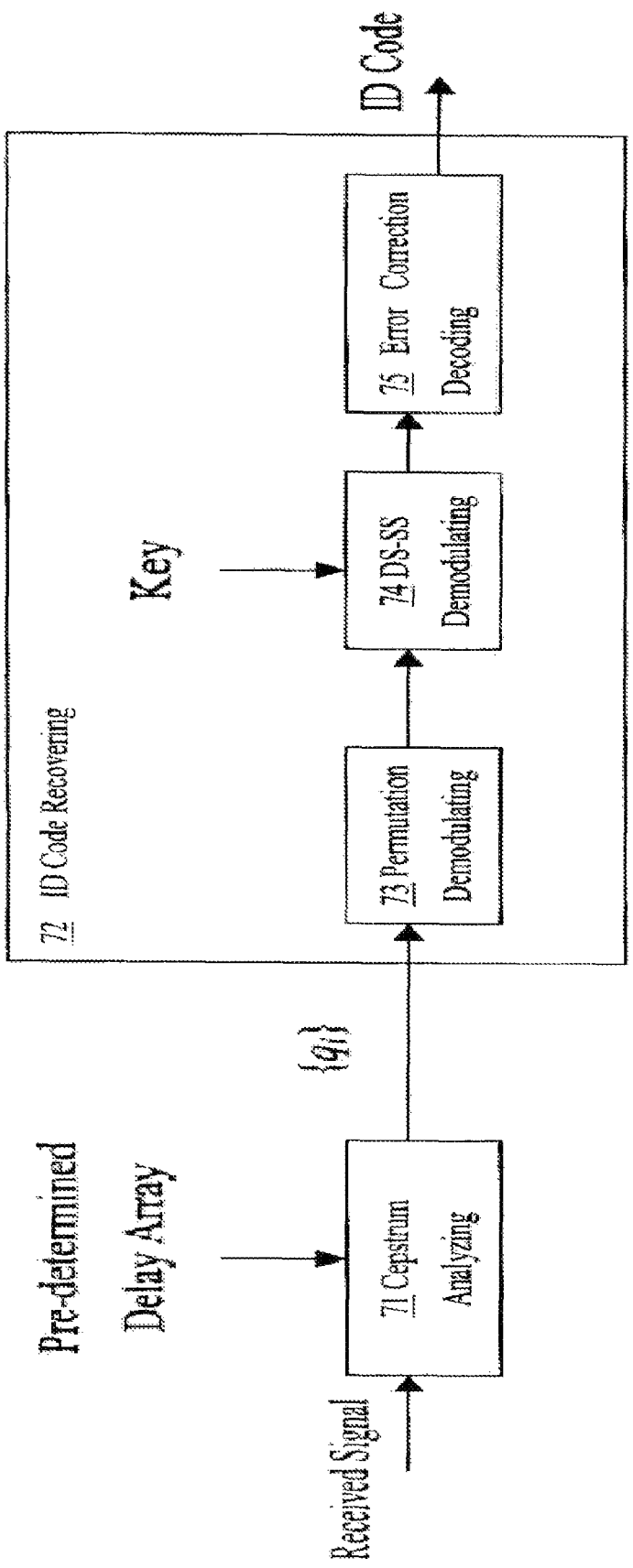
FIG. 7 depicts the schematic block diagram of a decoder 5 according to the embodiment of the invention.

FIG. 7 depicts the schematic block diagram of the decoder 5 according to the invention. The decoder 5 comprises a cepstral analyzing unit 71 and an ID code recovering unit 72 which in turn includes a permutation demodulating module 73, a DS-SS demodulating module 74, and an Error Correction Decoding module 75.

The received signal is recorded from the media program by the mobile device 4 and transmitted to the decoder 5. In the decoder 5, first the autocorrelation coefficients $\{q_i\}$ (i=1, . . . , :N) of the real cepstrum of the received signal are obtained by applying cepstrum analysis as Equation (7) along the predefined echo delay array by the cepstral analyzing unit 71.

In the permutation demodulating module 73 of the ID code recovering unit 72, using pseudo random permutation in Equation (4), the order of $\{q_i\}$ element is descrambled by inverse permutation as shown in Equation (9):

$$g_{o_i} = q_i (i=1, \ldots, N) \quad (9)$$

In the DS-SS demodulating module 74, the subsequence of $\{g_i\}$ with a length l=N/n is obtained as $$y_i^{(j)} = g_{i+(j-1)l} (i=1, \ldots, l) \quad (10)$$

for each j=1, . . . , n, $\{y_i^{(j)}\}$ is a sequence extracted from $\{g_i\}$ according to the interval of $c_j$ in Equation (1). And $\{y_i^{(j)}\}$ is normalized to have the mean value of 0 and the variance of 1, Given the same pseudo random sequence $\{r_i^{(j)}\}$ as in the encoder 2 side, DS-SS demodulation is performed. Correlation value $\rho_i$ corresponding to bit position j is obtained as $$\rho_j = \sum_{i=1}^{l} y_i^{(j)} r_i^{(j)} \tag{11}$$

Then, detected bit value $c'_j$ is determined as Equation (12).

$$c'_j = \begin{cases} 0, & \rho_j \leq 0 \\ 1, & \rho_j > 0 \end{cases} \tag{12}$$

In the Error Correction Decoding module 75, detected bit string {$c'_j$} is constructed as the detected codeword and Error Correction Decoding processing is performed. In this way, correctable bit errors are properly corrected, and the k-bit ID code is decoded.

Figure 8:
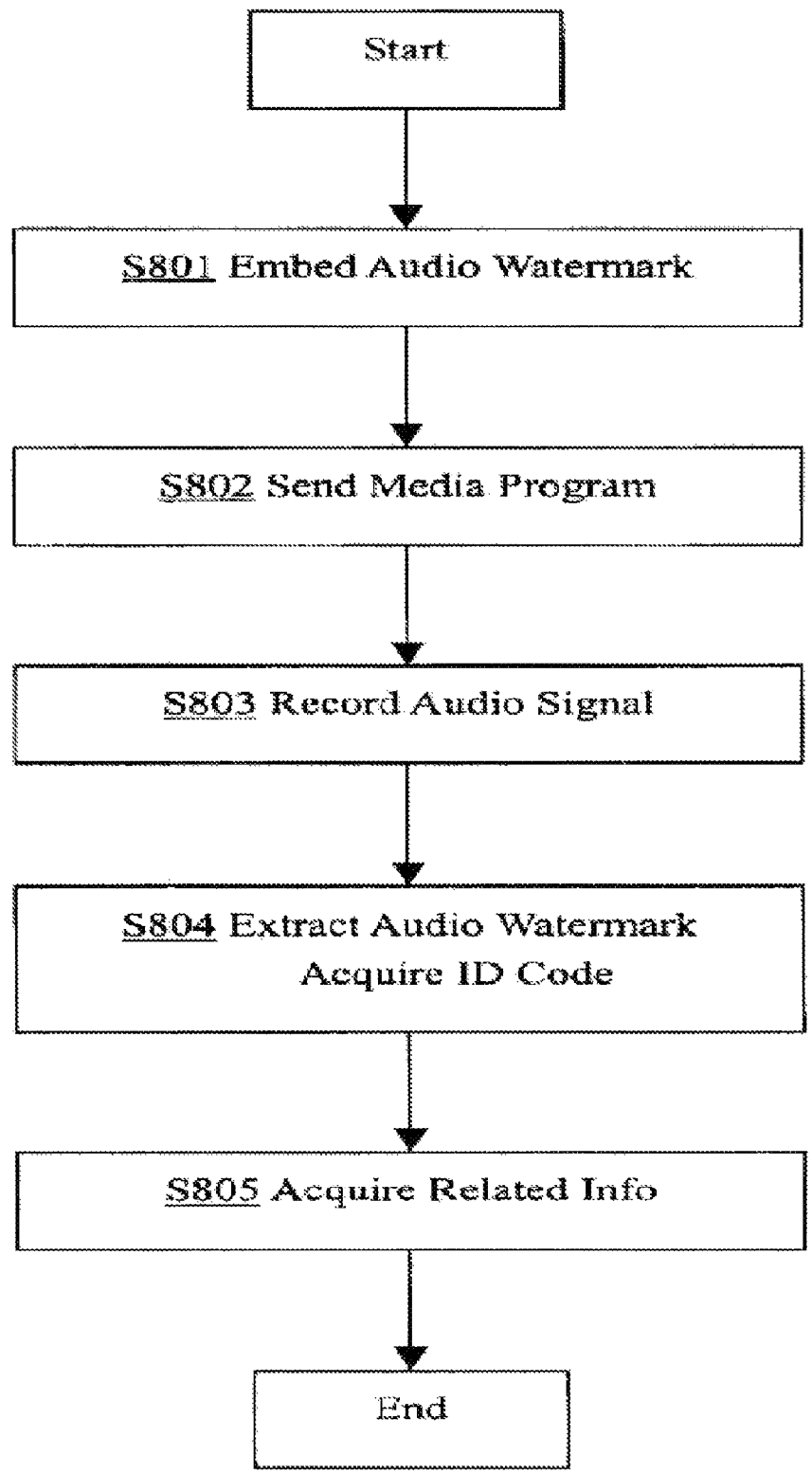
FIG. 8 depicts the flowchart of the method for obtaining related information about a media program according to the embodiment of the invention.

FIG. 8 depicts the flowchart of the method for obtaining related information about a media program according to the embodiment of the invention. As shown in the figure, in step S801, the encoder 2 on the encoder side embeds an audio watermark containing identification information of the media program into the audio signal of the media program. In the present embodiment, the identification information is an ID code. The flow of the embedding step S801 will be explained in further details below with reference to FIG. 9. In step S802, the media program with the audio signal (with the audio watermark embedded therein) is transmitted and output through the transmission medium 3 and the output device 7. In step S803, the audio recording means of the mobile device 4 records a portion of the audio signal of the media program embedded with the audio watermark. In step S804, the decoder 5 on the decoder side extracts the audio watermark from the recorded portion of the audio signal to obtain the identification information, i.e. the ID code, and provides the ID code to the database 6 storing the related information. The flow of extracting the ID code by decoder 5 will be explained in further detail below with reference to FIG. 10. In step 805, the related information about the media program is acquired from the database 6 and is provided to the mobile device 4. Thus, Related information about the media program is obtained by identifying the media information through audio watermark embedding and extracting.

Figure 9:
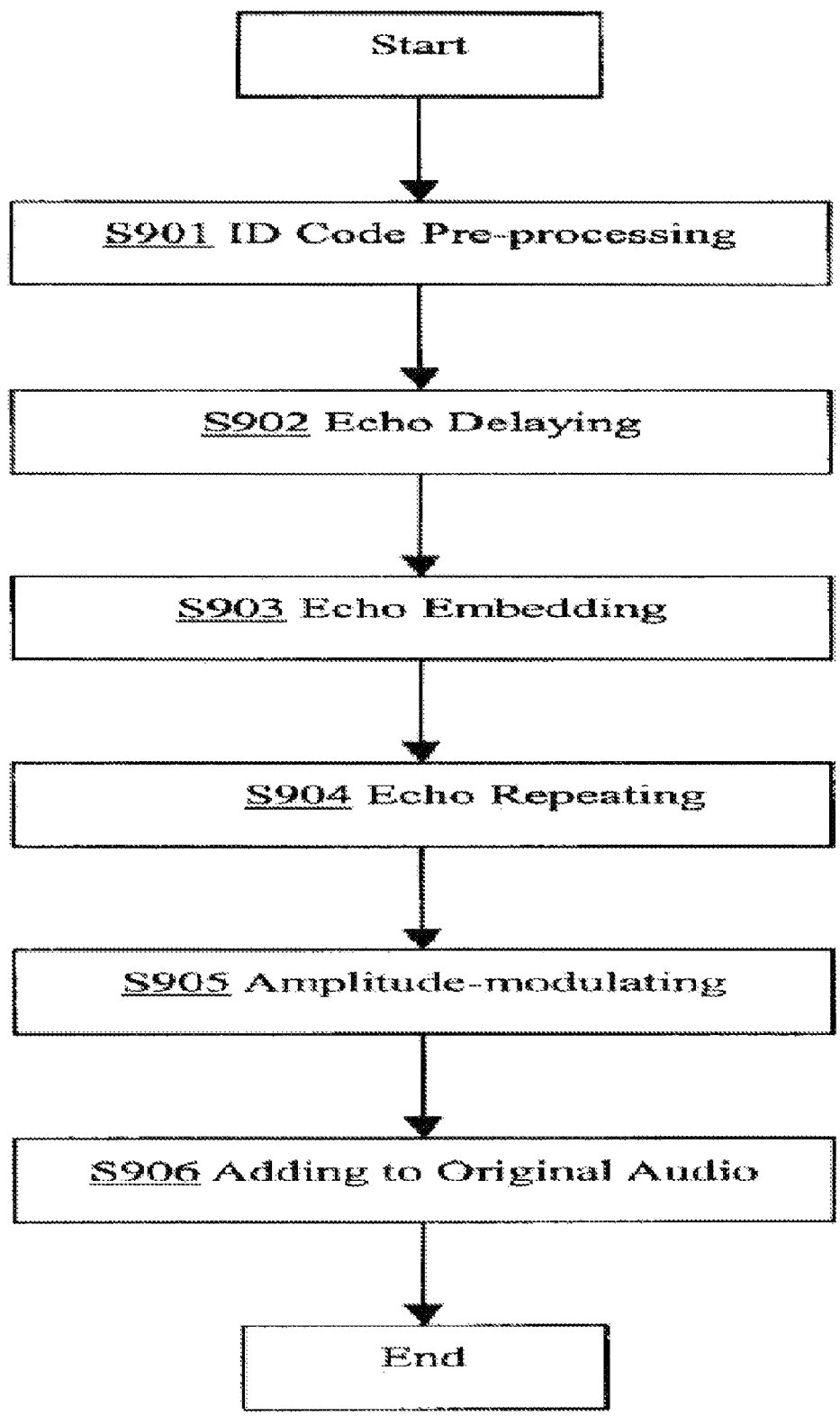
FIG. 9 depicts the flowchart of the method for embedding the audio watermarked into the audio signal according to the embodiment of the invention.

FIG. 9 depicts the flowchart of the method for embedding the audio watermark into the audio signal according to the embodiment of the invention, that is, the detailed flow of step S801 shown in FIG. 8. In step 901, the embedded sequence generating unit 21 performs pre-processing including error correction coding, redundancy, BPSK, DS-SS modulating and permutation as described above on the ID code to output the embedded sequence, that is, the pre-processed identification information. In step S902, the delaying module 41 delays the original audio signal by various time offsets that are determined in advance by the Analysis-by-Synthesis approach as described above. In step S903, an echo embedding process is performed in the echo embedding module 42, and the output is provided to the echo repeating module 43. In step 904, the antipodal echo process is repeated several times in the echo repeating module 43. In step 905, the amplitudes of these delayed signals are modulated with embedded sequence generated from the embedded sequence generating unit 21 in the amplitude modulating module 44. Note that as described above before the modulation a suppression processing may be performed on the embedded sequence in the masking module 45. In step 906, the modulated signals are added to the original audio signal to provide the watermarked audio signal in the adder module 46. Please note that the order of performing the above embedding step S903, echo repeating step S904 and amplitude modulating step S905 is not limited to what is described in the present embodiment. Actually, the order can be such that the amplitude modulating step is performed first, followed by the echo repeating step, and the echo embedding step is performed last, which is also within the scope of the invention.

Figure 10:
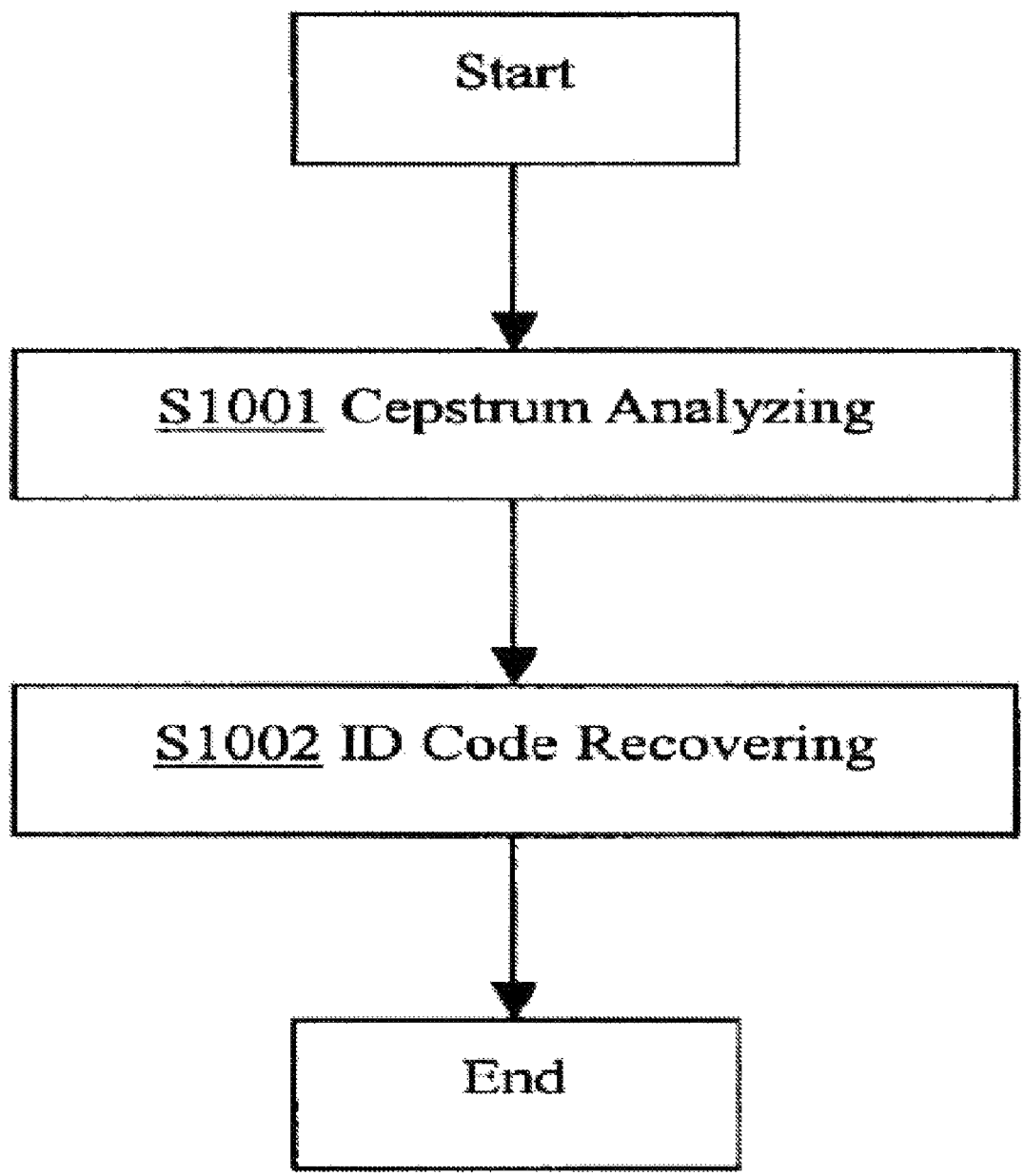
FIG. 10 depicts the flowchart of the method for extracting the audio watermarked from the audio signal according to the embodiment of the invention.

FIG. 10 depicts the flowchart of the method for extracting the audio watermark from the audio signal according to the embodiment of the invention, that is, the detailed flow of step S804 shown in FIG. 8. In step S1001, the autocorrelation coefficients of the real cepstum of the received signal are obtained by applying cepstrum analysis along the predefined echo delay array in the cepstral analyzing unit 71. Then, in step S1002, the ID code recovering unit 72 recovers the ID code by performing processing including permutation demodulating, DS-SS demodulating and error correction decoding.

Although the present invention has been described in detail with reference to particular embodiments, it should be understood that various other changes, substitutions, and alterations may be made hereto without departing from the spirit and scope of the present invention. Numerous other changes, substitutions, variations, alterations and modifications may be ascertained by those skilled in the art and it is intended that the present invention encompass all such changes, substitutions, variations, alterations and modifications as falling within the spirit and scope of the invention as defined in the appended claims.

The invention claimed is:

1. A method for obtaining related information about a media program containing an audio signal, comprising:
   an embedding step of embedding, by an electronic device, an audio watermark containing identification information of the media program into the audio signal of the media program;
   a transmitting step of transmitting the media program;
   a recording step of recording by a user a portion of the audio signal of the media program embedded with the audio watermark;
   an extracting step of extracting the audio watermark from the recorded portion of the audio signal to obtain the identification information and providing the identification information to a server storing the related information; and
   a related information providing step of providing the user with the related information about the media program according to the identification information from the server,
   wherein the embedding step comprises:
   identification information pre-processing step of performing a pre-processing on the identification information of the media program to obtain pre-processed identification information of the media program;
   echo delay array determining step of determining an echo delay array used in embedding a plurality of pairs of antipodal echoes into the audio signal;
   amplitude modulating step of modulating amplitudes of the plurality of pairs of antipodal echoes with the pre-processed identification information;
   echo repeating step of repeating the amplitude-modulated plurality of pairs of antipodal echoes; and echo embedding step of embedding the repeated and amplitude-modulated plurality of pairs of antipodal echoes into the audio signal along the echo delay array, wherein the identification information includes an identification code of the media program, and wherein the identification information pre-processing step comprises the steps of:

performing an Error Correction Coding on the identification code to obtain a codeword;

performing a redundancy processing on the codeword to produce a redundant sequence;

mapping the redundant sequence into a bit stream by using a Binary Phase Shift Keying modulation;

modulating the bit stream by using a pseudo random sequence modulation to perform a Direct Sequence Spread Spectrum modulation on the bit stream; and performing a permutation on the Direct Sequence Spread Spectrum modulated bit stream to scramble the order thereof so as to obtain the pre-processed identification information.

2. The method of claim 1, wherein the echo delay array determining step comprises determining the echo delay array by an analysis-by-synthesis approach.

3. The method of claim 2, wherein the analysis-by-synthesis approach comprises for each echo delay at a sampling rate of the recording step, locating a corresponding embedding position at a sampling rate of the transmitting step so that at that echo delay at the sampling rate of the recording step, the value of the cepstrum autocorrelation coefficient of the recorded portion of the audio signal reaches a maximum.

4. The method of claim 1, wherein the extracting step further comprises:

cepstrum analyzing step of performing a cepstrum analysis on the recorded portion of the audio signal to obtain the pre-processed identification information of the media program; and identification information recovering step of recovering the identification information of the media program by performing an inverse-processing of the pre-processing on the pre-processed identification information of the media program.

5. The method of claim 4, wherein the pre-processed identification information includes the pre-processed identification code of the media program, and wherein the identification information recovering step comprises the steps of performing a permutation demodulation on the pre-processed identification code to obtain a de-scrambled bit stream;

performing a Direct Sequence Spread Spectrum demodulation on the de-scrambled bit stream to obtain a codeword by using the same pseudo random sequence as used in pre-processing of the identification code; and performing an Error Correction Decoding on the codeword to recover the identification code.

6. The method of claim 1, wherein the number of he times of the repetition is 2.

7. A system for obtaining related information about a media program containing an audio signal, comprising:

embedding means for embedding an audio watermark containing identification information of the media program into the audio signal of the media program;

transmitting means for transmitting the media program;

recording means for recording a portion of the audio signal of the media program embedded with the audio watermark;

extracting means for extracting the audio watermark from the recorded portion of the audio signal to obtain the identification information and providing the identification information to a server storing the related information; and related information providing means located on the server for providing the related information about the media program according to the identification information, wherein the embedding means comprises:

identification information pre-processing means for performing a pre-processing on the identification information of the media program to obtain pre-processed identification information of the media program;

echo delay array determining means for determining an echo delay array used in embedding a plurality of pairs of antipodal echoes into the audio signal;

amplitude modulating means for modulating amplitudes of the plurality of pairs of antipodal echoes with the pre-processed identification information;

echo repeating means for repeating the amplitude-modulated plurality of pairs of antipodal echoes; and echo embedding means for embedding the repeated and amplitude-modulated plurality of pairs of antipodal echoes into the audio signal along the echo delay array, wherein the identification information includes an identification code of the media program, and wherein the identification information pre-processing means comprises:

means for performing an Error Correction Coding on the identification code to obtain a codeword;

means for performing a redundancy processing on the codeword to produce a redundant sequence;

means for mapping the redundant sequence into a bit stream by using a Binary Phase Shift Keying modulation;

means for modulating the bit stream by using a pseudo random sequence modulation to perform a Direct Sequence Spread Spectrum modulation on the bit stream; and means for performing a permutation on the Direct Sequence Spread Spectrum modulated bit stream to scramble the order thereof so as to obtain the pre-processed identification information.

8. The system of claim 7, wherein the echo delay array determining means determines the echo delay array by an analysis-by-synthesis approach.

9. The system of claim 8, wherein the analysis-by-synthesis approach comprises for each echo delay at a sampling rate of the recording means, locating a corresponding embedding position at a sampling rate of the transmitting means so that at that echo delay at the sampling rate of the recording means, the value of the cepstrum autocorrelation coefficient of the recorded portion of the audio signal reaches a maximum.

10. The system of claim 7, wherein the extracting means comprises:

cepstrum analyzing means for performing a cepstrum analysis on the recorded portion of the audio signal to obtain the pre-processed identification information of the media program; and identification information recovering means for recovering the identification information of the media program by performing an inverse-processing of the pre-processing on the pre-processed identification information of the media program.

11. The system of claim 10, wherein the pre-processed identification information includes the pre-processed identification code of the media program, and wherein the identification information recovering means comprises:

means for performing a permutation demodulation on the pre-processed identification code to obtain a de-scrambled bit stream;

means for performing a Direct Sequence Spread Spectrum demodulation on the de-scrambled bit stream to obtain a codeword by using the same pseudo random sequence as used in pre-processing of the identification code; and means for performing an Error Correction Decoding on the codeword to recover the identification code.

12. The system of claim 7, wherein the number of the times of the repetition is 2.

13. An apparatus for embedding an audio watermark into an audio signal, comprising:

identification information pre-processing means for performing a pre-processing on identification information related to the audio signal to obtain pre-processed identification information;

echo delay array determining means for determining an echo delay array used in embedding a plurality of pairs of antipodal echoes into the audio signal;

amplitude modulating means for modulating amplitudes of the plurality of pairs of antipodal echoes with the pre-processed identification information;

echo repeating means for repeating the amplitude-modulated plurality of pairs of antipodal echoes; and echo embedding means for embedding the repeated and amplitude-modulated plurality of pairs of antipodal echoes into the audio signal along the echo delay array, wherein the identification information related to the audio signal includes an identification code related to the audio signal, and wherein the identification information pre-processing means comprises:

means for performing an Error Correction Coding on the identification code to obtain a codeword;

means for performing a redundancy processing on the codeword to produce a redundant sequence;

means for mapping the redundant sequence into a bit stream by using a Binary Phase Shift Keying modulation;

means for modulating the bit stream by using a pseudo random sequence modulation to perform a Direct Sequence Spread Spectrum modulation on the bit stream; and means for performing a permutation on the Direct Sequence Spread Spectrum modulated bit stream to scramble the order thereof so as to obtain the pre-processed identification information.

14. The apparatus of claim 13, wherein the echo delay array determining means determines the echo delay array by an analysis-by-synthesis approach.

15. The apparatus of claim 14, wherein the analysis-by-synthesis approach comprises for each echo delay at a sampling rate of the recording means, locating a corresponding embedding position at a sampling rate of the transmitting means so that at that echo delay at the sampling rate of the recording means, the value of the cepstrum autocorrelation coefficient of the recorded portion of the audio signal reaches a maximum.

16. The apparatus of claim 13, wherein the number of the times of the repetition is 2.

17. A method for embedding an audio watermark into an audio signal, comprising:

identification information pre-processing step of performing a pre-processing on identification information related to the audio signal to obtain pre-processed identification information;

echo delay array determining step of determining an echo delay array used in embedding a plurality of pairs of antipodal echoes into the audio signal;

amplitude modulating step of modulating amplitudes of the plurality of pairs of antipodal echoes with the pre-processed identification information;

echo repeating step of repeating the amplitude-modulated plurality of pairs of antipodal echoes; and echo embedding step of embedding, by an electronic device, the repeated and amplitude-modulated plurality of pairs of antipodal echoes into the audio signal along the echo delay array, wherein the identification information related to the audio signal includes an identification code related to the audio signal, and wherein the identification information pre-processing step comprises the steps of:

performing an Error Correction Coding on the identification code to obtain a codeword;

performing a redundancy processing on the codeword to produce a redundant sequence;

mapping the redundant sequence into a bit stream by using a Binary Phase Shift Keying modulation;

modulating the bit stream by using a pseudo random sequence modulation to perform a Direct Sequence Spread Spectrum modulation on the bit stream; and performing a permutation on the Direct Sequence Spread Spectrum modulated bit stream to scramble the order thereof so as to obtain the pre-processed identification information.

18. The method of claim 17, wherein the echo delay array determining step comprises determining the echo delay array by an analysis-by-synthesis approach.

19. The method of claim 18, wherein the analysis-by-synthesis approach comprises for each echo delay at a sampling rate of the recording step, locating a corresponding embedding position at a sampling rate of the transmitting step so that at that echo delay at the sampling rate of the recording step, the value of the cepstrum autocorrelation coefficient of the recorded portion of the audio signal reaches a maximum.

20. The method of claim 17, wherein the number of the times of the repetition is 2.

21. An apparatus for extracting an audio watermark from an audio signal, wherein the audio watermark is embedded in the audio signal by amplitude-modulating echoes embedded in the audio signal by using pre-processed identification information related to the audio signal, the apparatus comprising:

cepstrum analyzing means for performing a cepstrum analysis on the audio signal to obtain the pre-processed identification information; and identification information recovering means for recovering the identification information by performing an inverse-processing of the pre-processing on the pre-processed identification information, wherein the pre-processed identification information includes a pre-processed identification code related to the audio signal, and wherein the identification information recovering means comprises:

means for performing a permutation demodulation on the pre-processed identification code to obtain a de-scrambled bit stream;

means for performing a Direct Sequence Spread Spectrum demodulation on the de-scrambled bit stream to obtain a codeword by using the same pseudo random sequence as used in pre-processing of the identification code; and means for performing an Error Correction Decoding on the codeword to recover the identification code.

22. A method for extracting an audio watermark from an audio signal, wherein the audio watermark is embedded in the audio signal by amplitude-modulating echoes embedded in the audio signal by using pre-processed identification information related to the audio signal, the method comprising:
- cepstrum analyzing step of performing a cepstrum analysis on the audio signal to obtain the pre-processed identification information; and
- identification information recovering step of recovering, by an electronic device, the identification information by performing an inverse-processing of the pre-processing on the pre-processed identification information, wherein the pre-processed identification information includes a pre-processed identification code related to the audio signal, and wherein the identification information recovering step comprises the steps of:
- performing a permutation demodulation on the pre-processed identification code to obtain a de-scrambled bit stream;
- performing a Direct Sequence Spread Spectrum demodulation on the de-scrambled bit stream to obtain a codeword by using the same pseudo random sequence as used in pre-processing of the identification code; and
- performing an Error Correction Decoding on the codeword to recover the identification code.

* * * * *